Patented July 7, 1925.

1,544,699

UNITED STATES PATENT OFFICE.

RAYMOND B. STRINGFIELD, OF AKRON, OHIO, ASSIGNOR TO THE GOODYEAR TIRE & RUBBER COMPANY, OF AKRON, OHIO, A CORPORATION OF OHIO.

METHOD OF CURING RUBBER.

No Drawing.   Application filed November 9, 1922. Serial No. 599,951.

*To all whom it may concern:*

Be it known that I, RAYMOND B. STRINGFIELD, a citizen of the United States, and resident of Akron, Ohio, have invented new and useful Improvements in Methods of Curing Rubber, of which the following is a specification.

My invention pertains to the manufacture of rubber, and it has particular relation to that step of the manufacturing process known as vulcanization in which the curing of the rubber is effected.

One object of my invention is to provide a novel method of introducing vulcanizing agents into a rubber compound. Another object is to provide a simple and inexpensive method whereby the rubber may be cured without the aid of heat.

Heretofore, in the vulcanization of rubber by treatment with gases, such, for example, as hydrogen sulfide and sulphur dioxide, difficulty has been experienced in introducing the hydrogen sulfide into the rubber cement on account of the low solubility thereof. By my invention I have provided a method of introducing any desired gas into the rubber cement, whereby the difficulties which obtain by reason of the low solubility of the gas in the cement are eliminated.

One method of curing, at present employed, consists of passing a sheet of uncured rubber through a container filled with sulphur dioxide, and through a second container filled with hydrogen sulfide. This method is objectionable owing to the difficulty of sealing the gas chambers, especially in installations in which the cure must be continuous for continuously moving material. This difficulty is also avoided by my invention because both gases which interact to effect a cure may be introduced into the rubber in the milling process without danger of disseminating the gases throughout the milling room.

In practicing my invention, I take advantage of the gas absorbing properties of certain inorganic oxide gels, such, for example, as silica gel. I have found that certain of the inorganic oxide gels may be saturated with a suitable vulcanizing agent, such as hydrogen sulfide, before being introduced into the rubber, which is usually accomplished during the milling process. Sulphur dioxide, which reacts with hydrogen sulfide to produce the sulphur necessary for vulcanization of the rubber, may be introduced in a similar manner, if desired, but on account of the ready solubility of this gas, such treatment may be considered unnecessary.

In treating rubber in accordance with my invention, I prefer to saturate the inorganic oxide gel with hydrogen sulfide and to mill the same into the rubber, thus thoroughly mixing the rubber, the oxide gel and the gas. A cement is then made from the mixture by the addition of a relatively small quantity of a rubber solvent, such, for example, as toluol. An additional quantity of rubber solvent saturated with sulphur dioxide is mixed with the cement just prior to disposing the rubber in its finally desired position. For example, in rubberizing a quantity of fabric, the solvent, saturated with the sulphur dioxide, should be mixed with the cement containing the hydrogen sulfide but a very short time before applying the mixture to the fabric. As a short interval of time is necessary for a complete vulcanization of the rubber, it will not be vulcanized until after being placed in its final position on the fabric.

The rubber may also be cured after constructing a piece of material or an article, such, for example, as rubberized fabric, by spreading thereon a cement containing the oxide gel impregnated with hydrogen sulfide, permitting the same to dry, and subsequently passing it through a chamber containing sulphur dioxide, the resulting reaction producing the desired cure.

Also, if desired, the cement making step of the process may be eliminated by introducing both the hydrogen sulfide and sulphur dioxide into the rubber by means of the oxide gel while on the mill, the rubber being thereafter calendered to the desired thickness and form.

My invention may likewise be applied to the manufacture of artificial leather, in which a quantity of separated fibers are provided with individual coverings and are then arranged in a matted formation in any desired manner and in any particular shape. It is highly desirable, in the manufacture of material of the character in question, that the cure of the rubber be effected without heating the material to a high temperature on account of the fact that the fibers in the material are likely to be charred and seriously damaged as a result. In the manufacture of the material in question, the oxide gel, impregnated with hydrogen sulfide, should be introduced into the rubber solution prior to the deposition of the rubber on the individual fibers. The sulphur dioxide may be introduced therein either before, during, or after the actual precipitation of the rubber on the fibers, or after the fibers are molded to form and dried.

It may be desirable, in some instances, to heat the mixture, of which the activated oxide gel constitutes a portion, at the time of adding the sulphur dioxide, in order to drive the hydrogen sulfide from the oxide gel to facilitate its interaction with the sulphur dioxide. Also, it may be desired to impregnate a portion of the gel with hydrogen sulfide, and another portion with sulphur dioxide, and mill both into the rubber, the cure being effected at any stage of the process by so heating the material as to drive the gases from the gel and into contact with each other.

Furthermore, if desired, a quantity of the inorganic oxide gel, which is adapted to be saturated, may be milled into the rubber compound, and the compound subsequently passed through a chamber containing hydrogen sulfide and sulphur dioxide. The presence of the oxide gel in the compound permits of thorough impregnation by the gas in a much shorter time than is necessary when the gel is not present.

I have found that, of the various inorganic oxide gels, silica gel appears to be preferable, and that iron and aluminum gels might also be used to advantage for this purpose. It is, of course, understood that any desired gas or other fluid aside from the hydrogen sulfide and sulphur dioxide, or in addition thereto, may be introduced into the rubber by means of the oxide gel to accomplish any desired purpose, such as, for making sponge rubber, for neutralizing the acidity caused by sulphur in the heat cure, etc.

Although I have disclosed several forms which my invention may assume, and have described in detail several applications thereof, it will, nevertheless, be apparent to those skilled in the art that it is not so limited, but that various minor modifications and changes may be effected therein without departing from the spirit of my invention or from the scope of the appended claims.

What I claim is:

1. The method of treating rubber which comprises employing an inorganic oxide gel as a carrying agent for compounding fluids.

2. The method of treating rubber which comprises introducing fluids thereinto by means of an inorganic oxide gel.

3. The method of treating rubber which comprises introducing a curing agent thereinto combined with an inorganic oxide gel.

4. The method of treating rubber which comprises introducing sulphur thereinto by means of an inorganic oxide gel.

5. The method of treating rubber which comprises introducing hydrogen sulfide thereinto by means of an inorganic oxide gel, and subsequently treating the mixture with sulphur dioxide.

6. The method of treating rubber which comprises introducing hydrogen sulfide and sulphur dioxide into the rubber by means of an inorganic oxide gel.

7. The method of treating rubber which comprises employing silica gel as a carrying agent for rubber treating materials.

8. The method of treating rubber which comprises introducing a curing agent thereinto by means of silica gel.

9. The method of treating rubber which comprises introducing silica gel thereinto that is impregnated with sulphur.

10. The method of treating rubber which comprises introducing hydrogen sulfide and sulphur dioxide thereinto by means of silica gel.

In witness whereof, I have hereunto signed my name in the presence of two subscribing witnesses.

RAYMOND B. STRINGFIELD.

Witnesses:
 FRED A. LIND,
 L. M. HARTMAN.